Sept. 17, 1940. W. H. SCOTT 2,215,162
LOCK
Filed July 5, 1938
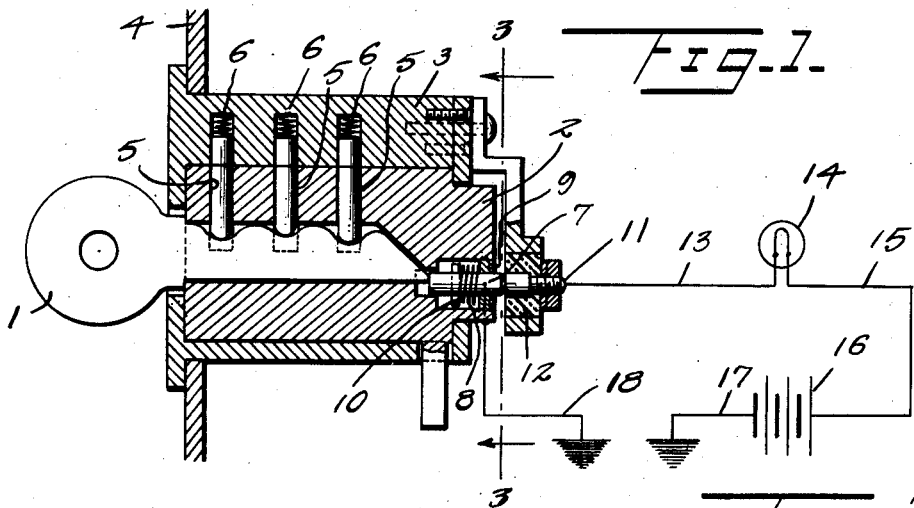
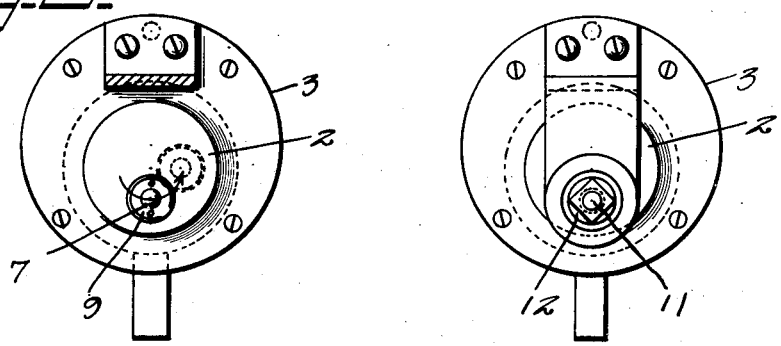
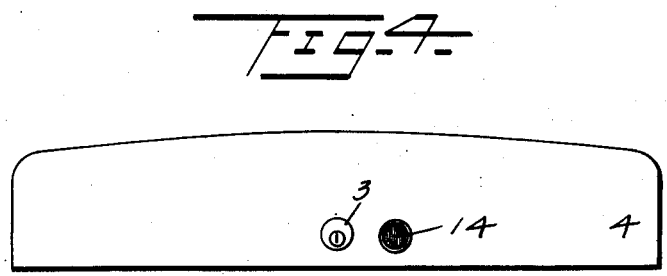
Inventor
William H Scott
By
his Attorney Patented Sept. 17, 1940

2,215,162

UNITED STATES PATENT OFFICE 2,215,162

LOCK

William Harrison Scott, Gettysburg, Pa.

Application July 5, 1938, Serial No. 217,512

3 Claims. (Cl. 200—44)

The invention, generally considered, relates to improvements in ignition locks for automobiles and more particularly to electrical devices for use with such locks, said devices being adapted to provide either a visible or audible signal should the ignition key be left in the lock housing after the ignition circuit has been disconnected.

The principal object of my invention is to provide a simple electric circuit connected to the ignition lock and preferably operable by the usual storage battery, whereby the insertion of the ignition key into the lock housing or barrel will energize the circuit and give a signal to the operator of the vehicle, which signal is immediately disconnected upon either the rotation of the said key or its removal from the lock barrel.

A still further object of the invention is to provide a simple electric circuit which may be readily connected to the ignition locks of automobiles now in use, said circuit and its associated parts serving by means of a signal to prevent the careless retention of the ignition key within the body of the lock.

To these and other ends the invention comprises the various instrumentalities hereinafter described, the novel features thereof being pointed out in the claims.

Before describing my invention in detail it may be advantageously pointed out that the police records throughout the United States indicate that more than half of the cars stolen are taken by reason of the fact that the owners or drivers leave their cars parked with the ignition keys in the locks. Such actions are, of course, invitations to thieves as well as to "joy riding" youngsters. If, therefore, a large proportion of these thefts can be prevented the resultant saving to people of the United States will be extremely large. I am, of course, aware that electric signals have been employed to indicate that the ignition switch of an automobile is turned on, the purpose being to prevent the draining of the car battery by such carelessness, but as soon as the ignition is turned off the indicating means is disconnected and hence has no value in preventing the other careless habit of motorists, that is leaving the key in the lock.

In the drawing:

Figure 1 is a view partially in section and partially diagrammatic, illustrating the invention as applied to an ignition lock for an automobile.

Figure 2 is a view in elevation, illustrating the connecting means for the electrical circuit.

Figure 3 is a section on the line 3—3 of Figure 1, illustrating the break in what might be termed the tell-tale circuit upon the rotation of the lock barrel so as to connect the ignition circuit.

Figure 4 shows the positions which the ignition switch and the tell-tale light may occupy with reference to the dashboard of an automobile.

The numeral 1 indicates a key adapted to cooperate with a lock barrel 2, the latter being mounted within the housing 3. The numeral 4 preferably indicates the surface of a car dashboard although it will, of course, be understood that the invention in its broader aspects is not limited to the specific application to an automobile. Mounted within openings 5 within the barrel and extending into the openings 6 in the housing are a plurality of spring-pressed two-part plungers 6ª, which permit the barrel to turn with reference to the housing only when a key of the proper make is positioned within the lock or barrel. Positioned at the inner end of the key opening within the barrel 2, I preferably provide a spring-pressed plunger 7, the inner end of which is adapted to be contacted by the inner end of the key 1 so that when the key 1 is inserted within the opening in the barrel 2 the end of the key will contact and force the plunger 7 outwardly against the tension of a spring 8 which is mounted between the abutments 9 and the collar 10 secured to the plunger 7. Carried by the housing 3 is a contact point 11 insulated from the housing by means of an insulating bushing 12 and connected to the contact member 11 is a wire 13 leading to a lamp 14, the other terminal of the lamp being connected by the wire 15 to one side of the storage battery 16, the opposite terminal of the battery being connected by a wire 17 to ground. The plunger 7 may be grounded on the barrel 2 which in turn is electrically connected to ground which is preferably the frame of the automobile.

In the event that the mounting for the ignition switch is insulated from the ground I may provide a wire 18 leading from the plunger 7, which wire is also grounded, on a ground common to the wire 17.

The operation of the device is as follows:

When the key 1 is inserted in the lock barrel 2 the end thereof will contact the plunger 7 which will force the end of the plunger inwardly so as to contact the contact point 11 carried by but insulated from the housing 3. The lamp 14, which may be of the flashing type, will immediately be connected in the circuit of the storage battery 16 and will continue to be lit or to flash, as the case may be, until the barrel 2 is rotated, as indicated in Figure 3, to connect the ignition of the automobile. As soon as the member 7 is rotated out of contact with the contact point 11, the lamp 14 will cease to operate and will be inoperative so long as the ignition is turned on. As soon, however, as the ignition is disconnected the contacts 7 and 11 are again made and the lamp will continue to operate until the key is removed from the barrel 2.

Since the lamp is preferably so positioned as to be within the immediate range of vision of the operator it will be obvious that this signal will call to his attention the fact that he has not removed the ignition key from the barrel and will in this manner prevent the careless motorist from leaving his automobile unlocked. It is obvious that in place of the lamp 14 some audible signal may be substituted so that the motorist will be warned by the audible signal rather than by a visual signal that his key is still within the barrel of the lock.

While I have described my invention in connection with an automobile it is obvious that the invention can be applied to the ordinary door lock to prevent the careless habit of leaving a key within the door after the door has been opened.

Having thus described my invention, what I claim as new and desire to secure by Letters Patent, is:

1. In a lock having a rotatable barrel adapted to receive a key, the combination of a plunger member carried by said barrel and a contact member normally arranged adjacent said plunger, said plunger member being urged into contact with said contact member on the insertion of the key into said barrel and being moved out of contact with said contact member on rotation of said barrel.

2. In a lock adapted to be connected in an electrical circuit for controlling the energization of a signal means and having a rotatable barrel for receiving the key, the combination of a plunger carried by said barrel and positioned within the path of movement of said key, a contact point positioned within the path of movement of said plunger, and means for insulating said plunger member from said contact point, said plunger and contact point being adapted to be connected to opposite ends of said circuit, said key being adapted to complete said circuit by moving said plunger into contact with said contact point and to disrupt said circuit by rotating said barrel, moving said plunger out of contact with said contact point.

3. In an ignition lock for automobiles wherein a rotatable barrel adapted to receive a key is mounted in a housing, the combination of a plunger member carried by said barrel, a contact point carried by said housing, and means reacting against said barrel for normally spacing said plunger from said contact point, said plunger lying in the path of travel of said key and being adapted to be moved thereby to contact said contact point, said contact being disrupted on rotation of said barrel.

WILLIAM HARRISON SCOTT.